Oct. 22, 1957     C. D. BRANSON     2,810,523
THERMOSTATIC MIXING VALVE
Filed Aug. 1, 1955
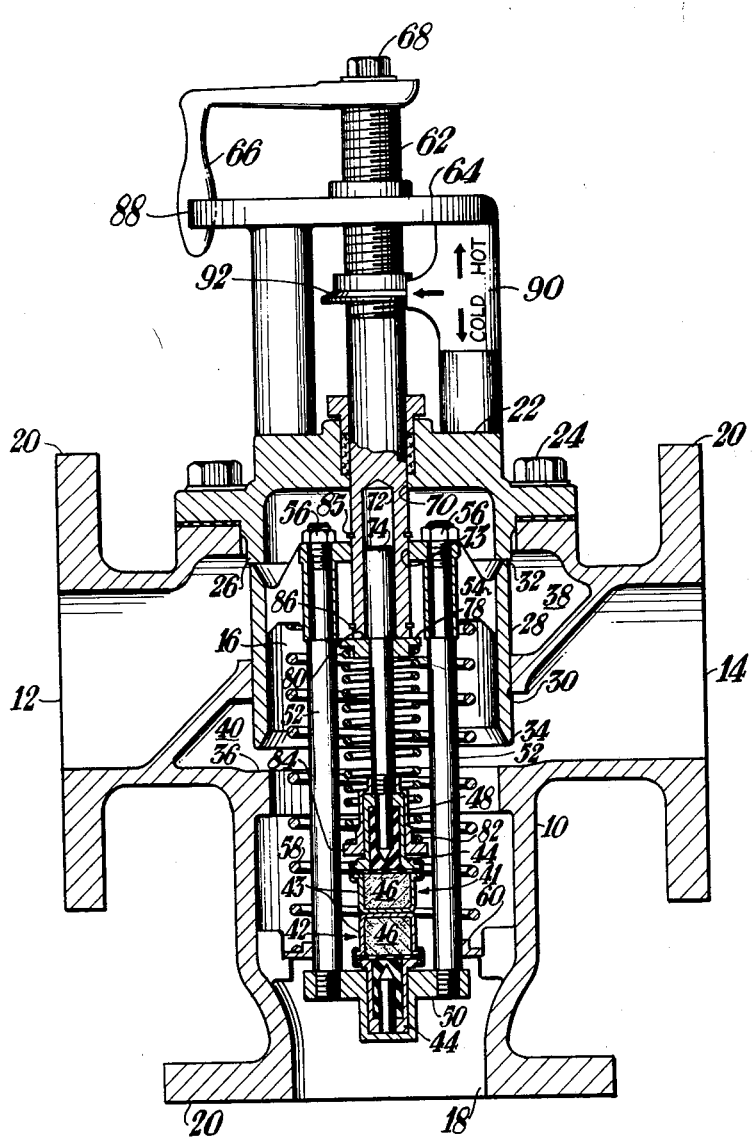
INVENTOR.
CHARLES D. BRANSON.
BY
HIS ATTORNEY.

United States Patent Office 2,810,523
Patented Oct. 22, 1957

2,810,523

THERMOSTATIC MIXING VALVE

Charles D. Branson, Knoxville, Tenn., assignor to Robertshaw-Fulton Controls Company, Greensburg, Pa., a corporation of Delaware Application August 1, 1955, Serial No. 525,660

3 Claims. (Cl. 236—12)

This invention relates to thermostatically controlled fluid mixing valves and more particularly to devices of this character for mixing hot and cold fluid and delivering hot fluid or a tempered fluid at a predetermined intermediate temperature.

In current devices of this type it has been customary to position a thermostatic actuating unit in the tempered fluid outlet and operatively connect the same to a valve device which is operative to control the inlet supply of hot and cold fluid. In such devices the valve is usually movable between two positions, one wherein the cold inlet fluid is closed and the other wherein the hot inlet fluid is closed. Biasing means are usually provided which are operative to bias the valve to one of these positions and move the valve to the biased position if the thermostat should fail or become inoperative.

Manually operable means have also been provided to enable the valve device to be operated manually. These means are generally operative to position the thermostat whereby a great temperature reduction or increase is required to cause movement of the valve to another position. Thus, the valve may be manually positioned in either its hot or cold positions.

Since the manual positioning of a valve in such devices is accomplished by positioning the thermostat, it is obvious that failure of the thermostat would also result in failure of the manually operable adjusting means since the same is dependent on the thermostat. Thus, failure of the thermostat in such current devices results in failure of both thermostatic control and manual control.

It is an object of this invention to render a thermostatic mixing valve operative manually in the event of failure of the thermostat.

Another object of this invention is to incorporate into a thermostatic mixing valve, a valve which can be adjusted manually to any position.

Another object of this invention is to adjust a valve independently of the thermostat by which it is actuated.

In a preferred embodiment of the invention, a casing is provided with a mixing chamber having inlets for hot and cold fluid and an outlet for tempered fluid. A valve is positioned in the chamber and movable between positions for controlling the flow of hot and cold fluid into the chamber. Means responsive to temperature variations of the tempered fluid are provided for actuating the valve between said positions. Adjustment means are provided whereby the valve member may be positioned manually in any position.

Other objects and advantages will become apparent from the following description taken in connection with the accompanying drawing which is a longitudinal view partly in section of a thermostatic mixing valve embodying this invention.

Referring more particularly to the drawing, the mixing valve includes a casing 10 provided with an inlet opening 12 for cold fluid and an inlet opening 14 for hot fluid. The inlets 12, 14 communicate with a valve or mixing chamber 16 within the casing 10 which is axially aligned and in communication with a tempered fluid outlet 18 in the bottom of the casing 10. The inlets 12, 14 and outlet 18 are each provided with a flange 20 by means of which suitable pipe fittings may be attached thereto.

The upper end of the casing 10 is provided with a cap 22 which is secured to the casing 10 by means of screws 24. The cap 22 defines an extending annular shoulder 26 within the chamber 16 which is operative as a valve seat for a piston type valve member 28. The valve member 28 is slidably positioned in an annular guide 30 defined by the casing 10 and provided with an annular tapered edge 32 at its upper end for engagement with the valve seat 26 and an edge 34 at the lower end for engagement with an annular shoulder or valve seat 36 defined by the casing 10.

The valve member 28 thus defines an annular passage 40 for hot fluid between the inlet 14 and chamber 16, and an annular chamber 38 for cold fluid between the inlet 12 and chamber 16. The guide 30 maintains axial alignment of the valve member 28 and permits axial reciprocable movement thereof between the seats 26, 36. When the valve member 28 is in engagement with the seat 26 as shown in the drawing, flow of cold fluid into the chamber 16 is prevented while flow of hot fluid into the chamber 16 is permitted. Movement of valve member 28 out of engagement with seat 26 and into engagement with seat 36 establishes communication between the cold fluid chamber 38 and chamber 16 and closes the hot fluid inlet 14. Thus, in the upper position of valve member 28 as shown in the drawing, only hot fluid will flow into the chamber 16 while in the lower position wherein valve member 28 engages the seat 36, only cold fluid will flow into the chamber 16. When the valve member 28 is positioned intermediate of the above positions, both hot and cold fluid will flow into the chamber 16.

For controlling the temperature of the tempered fluid flowing out the outlet 18, a thermostatic actuating device is positioned adjacent the outlet 18 and in axial alignment therewith. More particularly the thermostatic actuating device includes two thermally responsive units 41, 42 stacked in series for additive movement. Each of the units 41, 42 is of conventional form having a cup-shaped casing 43 and a movable end portion 44 and an expansible and fusible material 46. Any suitable fusible material which will give a large volumetric change on passing from the solid to the liquid state may be used, and since these devices are well known in the art further description is deemed unnecessary.

The portion 44 of the upper unit 41 is fixed within a cup-shaped support 48 which is fixed relative to the valve member 28 by a novel temperature adjusting means later to be described. The casings 43, 43 are in engagement while the end portion 44 of the lower unit 42 engages a non-circular cross-member 50 which is positioned above the outlet 18 and axially aligned with the outlet 18 and valve member 28. The member 50 is connected to the valve member 28 by means of a plurality (in this case two) of spaced rods 52, 52 which define a longitudinal axis coaxial with the valve member 28. Each of the rods 52 has one end thereof threaded within the cross member 50 and the other end thereof threaded and extending through a suitable bore of a non-circular hub 54 defined by the piston type valve member 28 to be fixed to the hub 54 by means of a nut 56. The valve member 28 is thus fixed to the member 50 and movable therewith.

A spring 58 encircles the rods 52, 52 and is mounted in compression between the hub 54 and an annular retaining ring 60 which is seated in a shoulder defined by the casing 10. The spring 58 is axially aligned with the valve member 28 and thermostat 42 and operative to bias the valve member 28 toward engagement with the upper valve seat 26. Should the cross member 50 be moved axially toward the outlet 18 by the lower portion 44 in response to expansion of the fusible material 46, 46, the valve member 28 will be moved toward engagement with the lower seat 36 to compress the spring 58. Movement of the lower portion 44 in the opposite direction in response to contraction of the fusible material 46, 46 will result in movement of valve member 28 toward engagement with the seat 26 under the bias of spring 58.

Novel means are provided for manually operating the valve member 28 and may be seen to include a stem 62 which has a portion thereof threaded within a plate 64 supported by the cap 22 and one end projecting above the plate 64 to have a manually operable crank 66 attached thereto by means of a nut 68. The stem 62 is axially aligned with the valve member 28 and the outlet 18 and extends through a suitable bore 70 in the cap 22 and a bore 73 in the hub 54 to have its other end engaging a yieldable means later to be described. The valve member 28 is slidably positioned on the stem 62 which cooperates with the guide 30 to maintain axial alignment of the valve member 28 with the seats 32, 36.

The lower end of the stem 62 is provided with an axial bore 72 in which one end of a connecting stem 74 is slidably positioned. The connecting stem 74 is axially aligned with adjusting stem 72 and has its other end threaded within the support 48. A disc 78 is slidably positioned on the stem 74 between the stem 62 and support 48 and engages the end of the stem 62. The disc 78 is biased into engagement with a shoulder 80 defined by the stem 74 by means of a spring 82 which is mounted in compression between the disc 78 and a flange 84 of the support 48.

The spring 82 is preferably stronger than the spring 58 and is operative to maintain the disc 78 in engagement with the shoulder 80 during normal conditions. The biasing force of spring 58 is transmitted through spring 82 and stem 74 and is operative to bias the disc 78 into engagement with the stem 62. Thus, during normal conditions the support 48 is fixed relative to the valve member 28. However, if the temperature of the tempered fluid should exceed the normal range and expansion of the fusible material 46, 46 occur after the valve member 28 is in engagement with the seat 36, the spring 82 will yield under the increased force, and the fixed end or support 48 will move toward the stem 62 to compress spring 82 and move the shoulder 80 out of engagement with the disc 78. Thus, the spring 82 is operative during overshooting to prevent excessive strain from being placed on the parts.

The above described yieldable connection between the thermostat actuating devices and stem 62 cooperates with the parts now to be described to permit manual positioning of the valve member 28. To this end, the stem 62 is provided with two annular recesses which are positioned on opposite sides of the cross member 54 and in which are fixed two rings 85, 86. The spacing between the rings 85, 86 is such that the valve member 28 can move through its full stroke between the seats 26, 36 in response to the thermostat 42 when the stem 62 is in the position shown. However, if the stem 62 is rotated clockwise by manipulation of the crank 66, the upper ring 85 will move axially with the stem 62 and engage the hub 54 and move the valve member 28 toward the seat 36 to establish a new range of movement for the valve member 28. Counterclockwise rotation of crank 66 will move the lower ring 86 into engagement with the hub 54 and move the valve member 28 toward engagement with the seat 26 to establish another range of movement for the valve member 28.

The crank 66 may be provided with the conventional swivel type connection (not shown) or the nut 68 removed and the crank 66 reversed whereby it may be rotated to the position shown to engage an abutment 88 of the plate 64 when not in use and lock the stem 62 in a desired controlling position. The cap 22 may be also provided with a suitable index marking 90 which is cooperable with a suitable pointer 92 carried by the stem 62 to indicate the operating position of the stem 62.

*Operation*

Assume as a first condition that the stem 62 is in the position shown in the drawing wherein the rings 85, 86 are positioned to permit movement of valve member 28 in its full stroke between the seats 26, 36 in response to the thermostat 41, 42. Since the valve member 28 is in engagement with the valve seat 26, hot fluid will flow into the valve chamber 16 from the hot fluid chamber 40, around the thermostat 41, 42 and out the tempered fluid outlet 18. The hot fluid heats the fusible material 46, 46 causing expansion thereof and movement of the member 50 toward the outlet 18. This movement moves the valve member 28 out of engagement with the seat 26 and permits flow of cold fluid into the chamber 16 from the cold fluid chamber 38.

The cold fluid mixed with the hot fluid reduces the temperature of the fluid flowing past the thermostat 41, 42 which permits the valve member 28 to move toward the seat 26 under the bias of spring 58. Thus, thermostat 41, 42 sensing the mixed temperature of the fluid flowing past it adjusts the valve member 28 to control inspiration of cold and hot fluid into the chamber 16.

Should an abnormal condition arise wherein the temperature of the tempered fluid is high enough to cause expansion of the fusible material 46, 46 when the valve member 28 engages the seat 36, the spring 82 will yield and allow the thermostat 41, 42 to override as hereinbefore described.

If it should be desired to manually position the valve member 28 to maintain the temperature of the tempered fluid higher than the control temperature of the thermostat 41, 42, the crank 66 may be rotated counterclockwise sufficiently to screw the stem 62 out of the casing 10 to position the rings 85, 86 whereby the hub 54 will engage the lower ring 86 before the valve member 28 engages the seat 36. Thus, a continuous supply of hot fluid will enter the mixing chamber 16.

The thermostat 42 sensing increased temperature of the mixed fluid will respond and tend to move the valve member 28 toward engagement with the seat 36, maintaining engagement of hub 54 with the ring 86. The resulting overshooting of thermostat 42 in this position of the valve member 28 will result in yielding of the spring 82. Thus, the ring 86 will cooperate with the thermostat 42 and the yieldable mounting therefor to effect manual positioning of the valve member 28 whereby a high mixed fluid temperature is attained.

Should it be desired to completely shut off the supply of cold fluid, the crank 66 may be rotated further counterclockwise until the ring 86 forces the valve member 28 into engagement with the seat 26. Since the valve member 28 is now locked in engagement with valve seat 26, response of the thermostat 42 at a higher temperature will cause yielding of spring 82 without placing undue strain on the parts.

If it should be desired to manually position the valve member 28 to maintain the temperature of the tempered fluid lower than the control temperature of the thermostat 41, 42, the crank 66 may be rotated clockwise from its initial position sufficiently to screw the stem 62 into the casing 10 to position the rings 84, 86 whereby the hub 54 will engage the upper ring 85 before the valve member 28 engages the seat 26. In this case, a continuous supply of cold fluid enters the mixing chamber 16. The thermostat 41, 42 sensing the lower temperature of the mixed fluid contracts to allow movement of the valve member 28 under the bias of the spring 58 and thus maintains engagement of the hub 54 with the ring 85.

If it is desired to completely shut off the supply of hot fluid to the mixing chamber 16, the crank 66 may be rotated further clockwise until the ring 85 forces the valve member 28 into engagement with the seat 36.

Assume now that during normal thermostatic operation of the device, failure of the thermostat 41, 42 occurs and that it is desired to manually position the valve member 28. In this situation, the thermostat 41, 42 has no control over the position of the valve member 28 and thus, the valve member 28 will move upward into engagement with the seat 26 under the bias of spring 58. To position the valve member 28, the crank 66 may be rotated clockwise until the ring 85 engages the hub 54 whereupon valve member 28 is moved out of engagement with seat 26. Since spring 58 now biases the hub 54 into engagement with the ring 85, the position of ring 85 and thus the position of the stem 62 will determine the position of the valve member 28. Thus, the valve member 28 may be manually positioned independently of the thermostat 41, 42.

The index 90 of the cap 22 may be provided with suitable markings or indicias as shown which indicate the various positions of the stem 62 for thermostatic or manual operation of the device to prevent any confusion on the part of the operator.

It should now be apparent that the utility of the invention is not limited to the application herein shown and described but is capable of much wider applications. For example, the device has particular utility when used as a diverter valve as a cooling control on large internal combustion engines. In this application of the device the opening 18 is preferably connected to the outlet of the engine water jacket and the opening 12 is connected through the cooler to the engine jacket inlet. The opening 14 may be connected to a by-pass around the cooler. Thus in this application the opening 18 is an inlet while the openings 12, 14 are both outlets.

If the temperature of the water in the engine water jacket is not up to the desired operating temperature, the thermostat 41, 42 and valve member 28 will be in the position shown and the cold water will flow out the opening 14 and through the by-pass to the engine jacket by-passing cooler. This promotes rapid warming of the engine to the desired operating temperature. As the temperature of the water increases, the thermostat 41, 42 senses the increased temperature of the fluid and moves the valve member 28 out of engagement with the seat 26 thus causing part of the water from the engine to flow out the opening 12 and through the cooler. That portion of the water flowing through the by-pass may be mixed with the portion flowing through the cooler between the cooler and the engine jacket inlet. This mixing results in a water temperature that is lower in the return than that which is leaving the engine. Consequently, regulated cooling is provided for the engine at all engine loads as a result of the valve member 28 diverting water from the by-pass circuit and through the cooler.

It should now be obvious that the mixing valve herein described accomplishes the objects of the invention and accordingly is capable of new and novel functions. It should also be obvious that while only one embodiment of the invention has been herein shown and described, it will be obvious to those skilled in the art that the invention may be variously embodied and that changes may be made in the construction and arrangement of parts without departing from the scope of the invention as defined in the appended claims.

It is claimed and desired to secure by Letters Patent:

1. In a fluid control valve, a casing having inlet and outlet pasages and a valve chamber intersecting said passages, a pair of annular valve seats in said chamber adjacent said passages respectively, a cylindrical hollow valve member cooperable with said valve seats for controlling fluid flow in said passages, a hub portion extending across one end of said valve member, support means extending from said hub portion through the opposite end of said valve member, thermally responsive means operatively engaging said support means beyond said valve member, an operating stem for said valve member extending from externally of said casing through said hub portion, a connecting stem mounted on said operating stem and said thermally responsive means, and yieldable means positioned on said support means and extending into said valve member to be operative on said hub portion for biasing said valve member toward one of said valve seats, said yieldable means being adapted to be overcome by said thermally responsive means for movement with said support means toward the other of said valve seats.

2. In a fluid control valve as claimed in claim 1 wherein a pair of spaced abutments are provided on said operating stem and positioned on opposite sides of said hub portion for moving said valve member through a range of movement defined by said valve seats in one position of said operating stem.

3. In a fluid control valve as claimed in claim 2 wherein manually operable means are provided for moving said operating stem to position said abutments relative to said valve member to cause movement of the latter relative to said valve seats independently of said temperature responsive means.

References Cited in the file of this patent

UNITED STATES PATENTS

| 1,847,911 | Trane | Mar. 1, 1932 |
| 2,377,028 | Nickolas | May 29, 1945 |
| 2,396,138 | Vernet | Mar. 5, 1946 |
| 2,628,781 | Cantalupo | Feb. 17, 1953 |

FOREIGN PATENTS

| 662,977 | Germany | July 26, 1938 |